_(12)_ United States Patent
Mellott et al.

(10) Patent No.: US 7,607,165 B2
(45) Date of Patent: Oct. 20, 2009

(54) METHOD AND APPARATUS FOR MULTIPLICATION AND/OR MODULAR REDUCTION PROCESSING

(75) Inventors: Jonathon D. Mellott, Gainesville, FL (US); Patrick Dennis Rugg, Winter Springs, FL (US)

(73) Assignee: The Athena Group, Inc., Gainesville, FL (US)

( * ) Notice: Subject to any disclaimer, the term of this patent is extended or adjusted under 35 U.S.C. 154(b) by 498 days.

(21) Appl. No.: 10/096,038

(22) Filed: Mar. 11, 2002

(65) Prior Publication Data

US 2002/0161810 A1    Oct. 31, 2002

Related U.S. Application Data

(60) Provisional application No. 60/324,718, filed on Sep. 24, 2001, provisional application No. 60/274,893, filed on Mar. 9, 2001.

(51) Int. Cl.
*H04L 9/00*    (2006.01)

(52) U.S. Cl. .......................................... 726/2; 370/204

(58) Field of Classification Search ................ 726/2–3; 708/3, 7, 446, 501–505, 519, 542, 655; 380/28; 345/605, 631, 472.1; 370/203–205, 212–216
See application file for complete search history.

(56) References Cited

U.S. PATENT DOCUMENTS

| | | | | |
|---|---|---|---|---|
| 4,949,293 A | * | 8/1990 | Kawamura et al. | 708/491 |
| 5,274,707 A | * | 12/1993 | Schlafly | 380/30 |
| 5,541,914 A | * | 7/1996 | Krishnamoorthy et al. | 370/427 |
| 5,828,590 A | * | 10/1998 | Chen et al. | 708/628 |
| 6,085,210 A | | 7/2000 | Buer | |
| 6,185,596 B1 | | 2/2001 | Hadad et al. | |
| 6,209,016 B1 | * | 3/2001 | Hobson et al. | 708/491 |
| 6,240,436 B1 | | 5/2001 | McGregor | |

(Continued)

FOREIGN PATENT DOCUMENTS

| | | |
|---|---|---|
| WO | WO 99/14880 A2 | 3/1999 |
| WO | WO 99/44329 A2 | 9/1999 |

OTHER PUBLICATIONS

Barrett, Paul, "Implementing the Rivest Shamir and Adleman Public Key Encryption Algorithm on a Standard Digital Signal Processor", *Computer Security Ltd.*, Aug. 1986, pp. 311-323, vol. 263, Springer Verlag, New York, NY.

(Continued)

*Primary Examiner*—Kimyen Vu
*Assistant Examiner*—Leynna T Truvan
(74) *Attorney, Agent, or Firm*—Saliwanchik, Lloyd & Saliwanchik

(57) ABSTRACT

The subject invention relates to a method and apparatus for multiplication of numbers. In a specific embodiment, the subject invention can be used to perform sequential multiplication. The subject invention also pertains to a method and apparatus for modular reduction processing of a number or product of two numbers. In a specific embodiment, sequential multiplication can be incorporated to perform modular reduction processing. The subject method and apparatus can also be utilized for modular exponentiation of large numbers. In a specific embodiment, numbers larger than or equal to $2^{128}$ or even higher can be exponentiated. For example, the subject invention can be used for exponentiation of number as large as $2^{1024}$, $2^{2048}$, $2^{4096}$, or even larger.

21 Claims, 10 Drawing Sheets

U.S. PATENT DOCUMENTS

| | | |
|---|---|---|
| 6,282,290 B1 | 8/2001 | Powell et al. |
| 6,356,636 B1 * | 3/2002 | Foster et al. .................. 380/30 |
| 6,366,673 B1 * | 4/2002 | Hollmann et al. ............. 380/28 |
| 6,369,727 B1 * | 4/2002 | Vincze ....................... 341/131 |
| 6,735,611 B2 * | 5/2004 | Vanstone ................... 708/492 |
| 6,925,543 B2 * | 8/2005 | Takahashi et al. ........... 711/170 |
| 6,963,977 B2 * | 11/2005 | Chen et al. .................. 713/183 |

OTHER PUBLICATIONS

Dhem, Jean-François, Thesis, "Design of an efficient public-key cryptographic library for RISC-based smart cards", *Faculté des Sciences Appliquées Laboratoire de Microélectrique, Université catholique de Louvain*, pp. 11-56, May 1998.

Menezes, Alfred J. et al., *Handbook of Applied Cryptography*, 1997, Chapters 2 and 14, CRC Press, Boca Raton, FL.

* cited by examiner

METHOD AND APPARATUS FOR MULTIPLICATION AND/OR MODULAR REDUCTION PROCESSING

CROSS-REFERENCE TO A RELATED APPLICATION

This application claims priority from provisional patent application U.S. Ser. No. 60/324,718; filed Sep. 24, 2001 and provisional patent application U.S. Ser. No. 60/274,893; filed Mar. 9, 2001.

BACKGROUND OF THE INVENTION

The subject invention relates to a method and apparatus for performing multiplication and/or modular reduction computations. The subject method and apparatus can utilize the Barrett modular reduction algorithm (see for example Menezes, A., van Oorschot, P., and Vanstone, S., *Handbook of Applied Cryptography*, CRC Press, 1996) to implement automatic computing machinery. The subject method and apparatus can be used to implement modular multiplication and exponentiation operations.

In the past, it has often been impractical to implement large-scale digital processors using a single semiconductor device due to the limitations of the amount of logic that can be placed on such a device. This has led to the selection and development of processors that are optimized for minimum silicon resource utilization. Modular reduction and modular multiplication has been implemented using the Montgomery reduction or Montgomery multiplication algorithms (see for example Menezes, et al.). Implementations using the Montgomery algorithms have the advantage of requiring less memory and fewer discreet multiplication operations than required to implement the Barrett algorithm. As it became possible to integrate large-scale digital processors onto a single semiconductor device, the methodology of using Montgomery algorithm implementations was carried forward. An example of such a digital processor is given in U.S. Pat. No. 6,085,210 (Buer). Other examples of Montgomery algorithm digital processors can be found in U.S. Pat. No. 6,240,436 (McGregor), U.S. Pat. No. 6,282,290 (Powell, et al.), and U.S. Pat. No. 6,185,596 (Hadad, et al.). These implementations suffer from limitations in the ability to exploit and sustain parallel use of many multipliers, thus limiting their overall processing speed.

The Barrett modular reduction algorithm is given here to establish notation (see for example Menezes, et al.).

Let x be a non-negative integer with up to a 2k digit radix b representation ($x = \{x_{2k-1}, \ldots, x_1, x_0\}$). Let m be a modulus with a k digit radix b representation where the most significant digit is not equal to zero ($m = \{m_{k-1}, \ldots, m_1, m_0\}$, $m_{k-1} \neq 0$). The Barrett modular reduction algorithm computes $r = x \bmod m$, where $r \in \{0, 1, 2, \ldots, m-1\}$. Define $\mu = \lfloor b^{2k}/m \rfloor$. The algorithm is given by the following steps.

1. $q_1 \leftarrow \lfloor x/b^{k-1} \rfloor$, $q_2 \leftarrow q_1 \mu$, $q_3 \leftarrow \lfloor q_2/b^{k+1} \rfloor$
2. $r_1 \leftarrow x \bmod b^{k+1}$, $r_2 \leftarrow q_3 m \bmod b^{k+1}$, $r \leftarrow r_1 - r_2$
3. If $r < 0$ then $r \leftarrow r + b^{k+1}$
4. While $r \geq m$ do: $r \leftarrow r - m$ Note that it is well-known that step 4 in the above algorithm will repeat not more than twice.

For an implementation of the Barrett algorithm using digital logic it is preferable to choose the radix b to be a power of two (e.g., $b = 2^{32}$). Given the radix is a power of two, define N to be the number of bits per radix b digit; that is, $N = \log_2 b$. It should be noted that if b is a power of two then the operator $\lfloor \cdot / b^k \rfloor$ is a right shift by k N-bit digits, and the operator ($\cdot \bmod b^k$) is the k least significant N-bit digits.

BRIEF SUMMARY OF INVENTION

The subject invention relates to a method and apparatus for multiplication of numbers. In a specific embodiment, the subject invention can be used to perform sequential multiplication. The subject invention also pertains to a method and apparatus for modular reduction processing of a number or product of two numbers. In a specific embodiment, sequential multiplication can be incorporated to perform modular reduction processing. The subject method and apparatus can also be utilized for modular exponentiation of large numbers. In a specific embodiment, numbers larger than or equal to $2^{128}$ or even higher can be exponentiated. For example, the subject invention can be used for exponentiation of number as large as $2^{1024}$, $2^{2048}$, $2^{4096}$, or even larger.

DETAILED DESCRIPTION OF THE INVENTION

Figure 1:
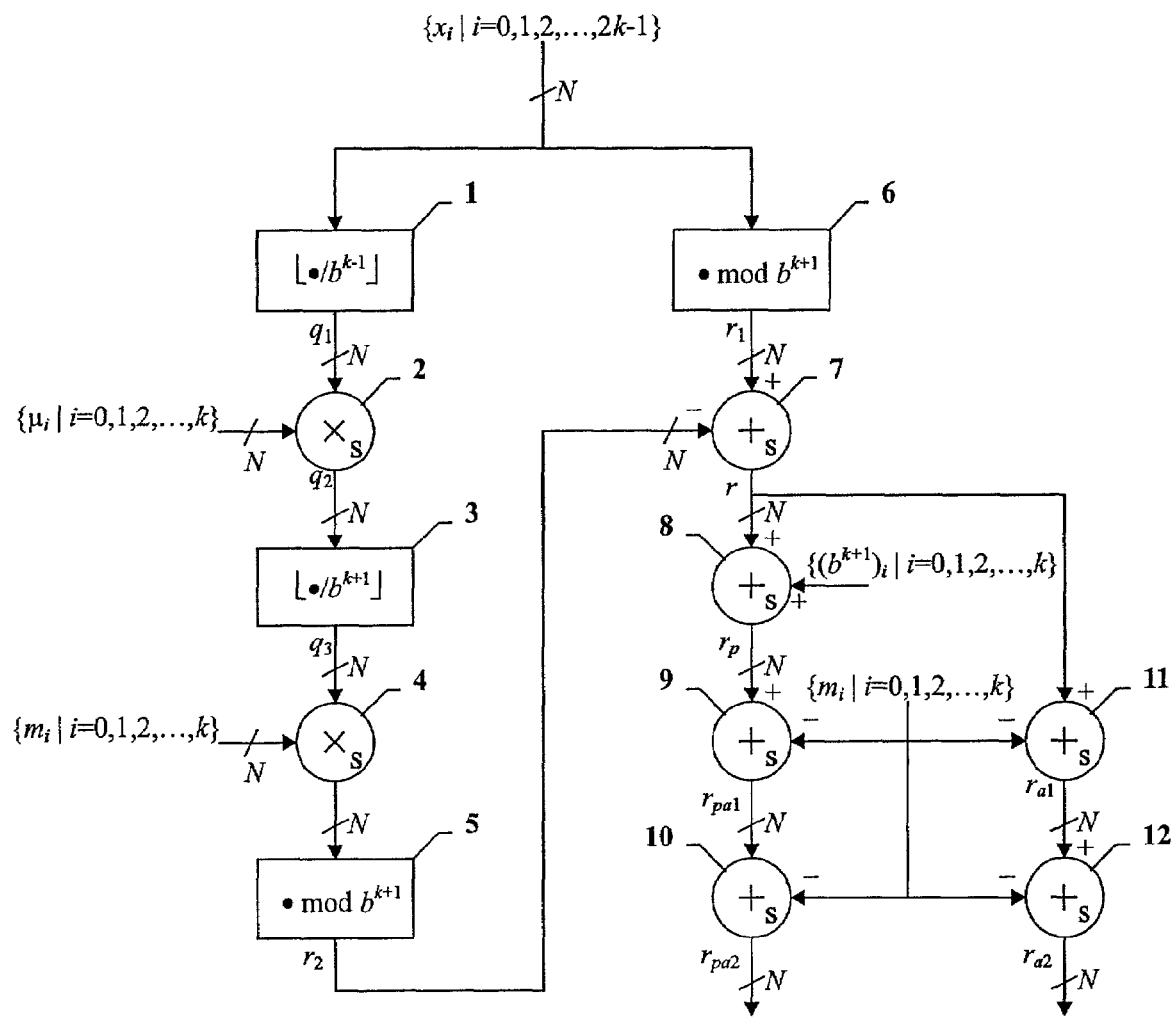
FIG. 1 shows a block diagram of a sequential modular reduction processor in accordance with the subject invention.

The subject invention relates to a method and apparatus for multiplication of numbers. In a specific embodiment, the subject invention can be used to perform sequential multiplication. The subject invention also pertains to a method and apparatus for modular reduction processing of a number or product of two numbers. In a specific embodiment, sequential multiplication can be incorporated to perform modular reduction processing. The subject method and apparatus can also be utilized for modular exponentiation of large numbers. In a specific embodiment, numbers larger than or equal to $2^{128}$ or even higher can be exponentiated. For example, the subject invention can be used for exponentiation of number as large as $2^{1024}$, $2^{2048}$, $2^{4096}$, or even larger.

A block diagram of a specific embodiment of a sequential modular reduction processor, using the notation described above, is shown in FIG. 1. The sequential modular reduction processor can perform processing one radix b digit at a time, starting with the least significant digit, and proceeding to the most significant digit. The input x can be supplied to the machine starting with the least significant digit. Alternatively, x can be received most significant digit first, stored, and processed least significant digit first. The entire stream of digits can be represented as the sequence $\{x_i | i=0, 1, 2, \ldots, 2k-1\}$. A shift-and-truncate-down operator 1 produces the result $q_1$. Other means of dividing by $b^{k-1}$ can also be used. Starting with the least significant digit of the result produced by the shift-and-truncate-down operator 1, a sequential multiplier 2 multiplies $q_1$ by $\mu$ producing $q_2$. The result of the sequential multiplier 2 is processed by another shift-and-truncate-down operator 3 to produce the result $q_3$. Again, other means of dividing by $b^{k-1}$ can also be used. It is important to note that while this discussion specifies a sequential multiplier that accepts a stream of operand digits sequentially, and produces a stream of result digits sequentially, it is conceivable that in some instances all digits of the operands could be processed simultaneously by a multiplier. In practice, a direct multiplier implementation is challenging to construct efficiently in the neighborhood of 32-64 bit operands, becomes difficult in the neighborhood of 64-128 bit operands, and is very difficult to construct an efficient implementation of a direct multiplier for greater than 128 bit operands. The result $q_3$ is multiplied by m by a sequential multiplier 4 and modularly reduced by a modular reduction operator 5. The modular reduction operator 5 simply keeps the k+1 least significant digits of the product produced by the sequential multiplier 4.

Meanwhile, the input x is also reduced by a modular reduction operator 6. The result of the modular reduction operator 5 is subtracted from the result of the modular reduction operator 6 by a sequential subtraction operator 7. Steps 3 and 4 can implemented in a variety of ways to determine a final result for x mod m, where x mod m $\in \{0, 1, 2, \ldots, m-1\}$. Including the difference r produced by the sequential subtraction operator 7, which corresponds to step 2 in the modular reduction algorithm described above, six different candidate final results can be computed in order to provide the values that may be produced by steps 3 and 4 in the algorithm. In a specific embodiment, sequential arithmetic operators can be used such that the direction of the branches are not known until the most significant (and last) digit is processed. A sequential addition operator 8 can implement the addition implied by step 3 of the algorithm. A sequential subtraction operator 9 followed by another sequential subtraction operator 10 can produce the two possible values implied by step 4 of the algorithm if r<0 in step 3. Simultaneously, a sequential subtraction operator 11 followed by another sequential subtraction operator 12 can produce the two possible values implied by step 4 of the algorithm if r$\geq$0 in step 3. Selection of the final result can be accomplished when the last digit is processed by the sequential subtraction operators 7, and 9-12.

Since the sequential modular reduction processor shown in FIG. 1 is a feed-forward system, pipelining may be added at the user's discretion to achieve higher throughput. Operator scheduling or sharing may also be implemented to reduce the amount of hardware required to implement the processor shown in FIG. 1. Specifically, the sequential multipliers 2 and 4 may be implemented using a single sequential multiplier implementation, and the six sequential addition/subtraction operators 7-12 may be implemented using fewer than six sequential addition/subtraction implementations.

Figure 4:
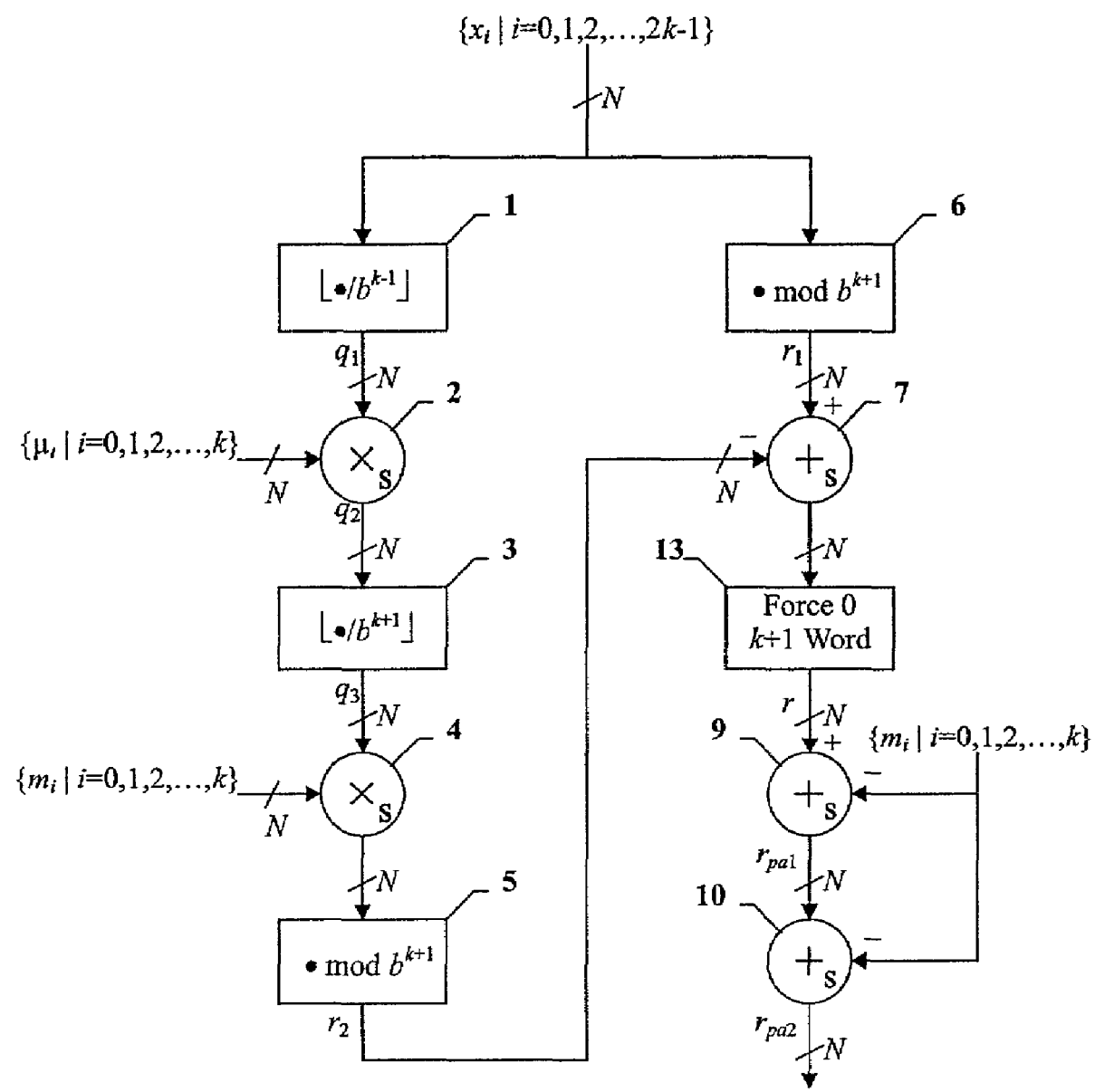
FIG. 4 shows a block diagram of a specific embodiment of a sequential modular reduction processor in accordance with the subject invention.

Referring to FIG. 4, a block diagram of a specific embodiment of the subject invention is shown. FIG. 4 shows a sequential modular reduction processor in which the differences produced by the sequential subtraction operators 7, 9, and 10, can be represented as two's complement values. Referring back to FIG. 1, if the difference produced by the sequential subtraction operator 7 is negative, then the sum produced by the sequential add operator 8 will be zero in the k+1'th word, and first through k'th word produced by the sequential add operator 8 will be the same as the output of the sequential subtraction operator 7 in those words. It is also the case that if the difference produced by the sequential subtraction operator 7 is positive, then the output of the operator 7 will also be zero in the k+1'th word. This implies that the operator 8 can be realized by blanking the k+1'th word of the output of the operator 7 and that the input to the sequential subtraction operators 9 and 11 will be exactly the same up to the selection of the correct result from $\{r, r_p, r_{pa1}, r_{pa2}, r_{a1}, r_{a2}\}$. Therefore, the sequential subtraction operators 11 and 12 are redundant, and the results $\{r_p, r_{pa1}, r_{pa2}\}$ do not have to be stored pursuant to selection of the correct result by means of the algorithm described above. This is significant as it reduces the number of speculatively stored results from six to three. The embodiment shown in FIG. 4 is effected by removing operators 11 and 12 from the embodiment of FIG. 1, and replacing the operator 8 shown in FIG. 1 with an operator 13 that forces the k+1'th word of each operation to zero.

Figure 8:
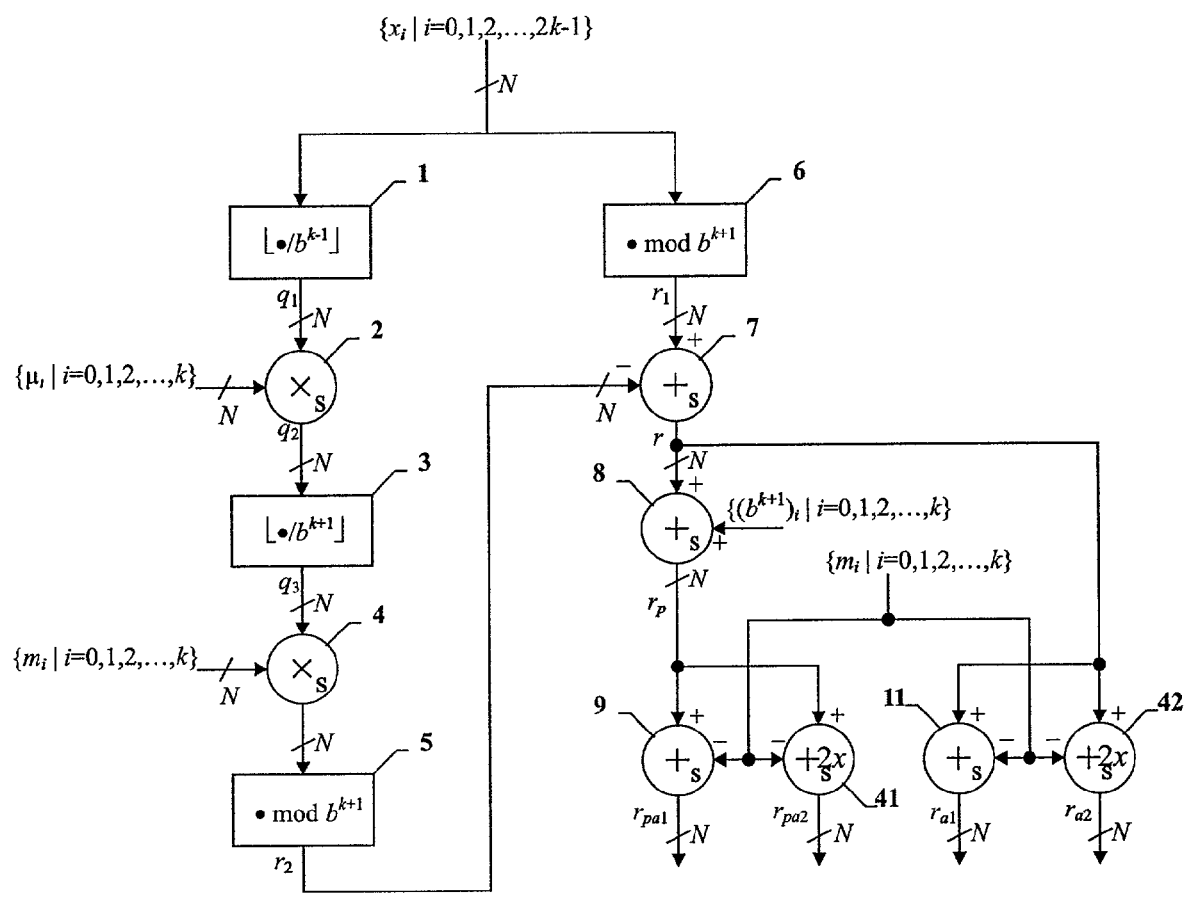
FIG. 8 shows a block diagram of a specific embodiment of a sequential modular reduction processor in accordance with the subject invention.

Referring to FIG. 8, a block diagram of a specific embodiment of the subject invention is shown. Referring back to FIG. 1, sequential subtraction operators 9 and 10 produce the differences $r_{pa1}=r_p-m$ and $r_{pa2}=r_{pa1}-m$, while sequential subtraction operators 11 and 12 produce the differences $r_{a1}=r-m$ and $r_{a2}=r_{a1}-m$. Alternatively, the differences $r_{pa2}$ and $r_{a2}$ may be produced as $r_{pa2}=r_p-2m$ and $r_{a2}=r-2m$, as is demonstrated in FIG. 8. The former difference is computed by a sequential subtractor with multiplication of the subtrahend input by two, 41, while the latter difference is computed by a sequential subtractor with multiplication of the subtrahend input by two, 42. This is significant as the differences $r_{pa1}, r_{pa2}, r_{a1}$, and $r_{a2}$ are produced simultaneously, making all of these results available one clock cycle sooner than they would be otherwise.

Figure 9:
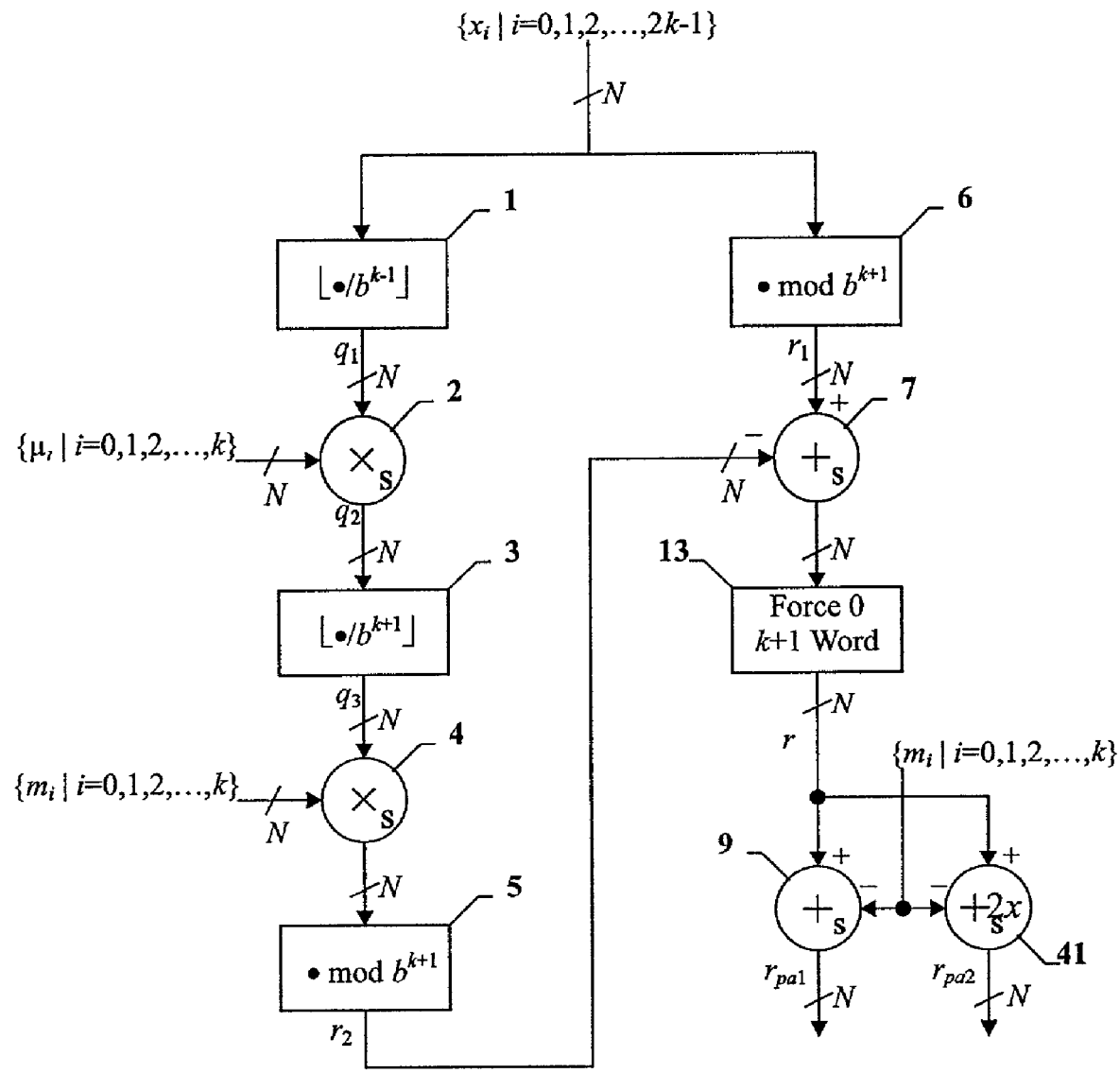
FIG. 9 shows a block diagram of a specific embodiment of a sequential modular reduction processor in accordance with the subject invention.

Referring to FIG. 9, a block diagram of a specific embodiment of the subject invention is shown. Referring back to FIG. 4, sequential subtraction operators 9 and 10 produce the differences $r_{pa1}=r_p-m$ and $r_{pa2}=r_{pa1}-m$. Alternatively, the difference $r_{pa2}$ may be produced as $r_{pa2}=r_p-2m$, as is demonstrated in FIG. 9. This difference is computed by a sequential subtractor with multiplication of the subtrahend input by two, 41. This is significant as the differences $r_{pa1}$ and $r_{pa2}$ are produced simultaneously, making these results available one clock cycle sooner than they would be otherwise.

Since the sequential modular reduction processors shown in FIGS. 4, 8, and 9 are feed-forward systems, pipelining may be added at the user's discretion to achieve higher throughput. Operator scheduling or sharing may also be implemented to reduce the amount of hardware required to implement the processor shown in FIG. 1. Specifically, the sequential multipliers 2 and 4 may be implemented using a single sequential multiplier implementation, and the w sequential addition/subtraction operators 7-11, 41, and 42 may be implemented using fewer sequential adders/subtractors with and without operand multiplication by two implementations than are shown in FIGS. 4, 8, and 9.

Figure 2A:
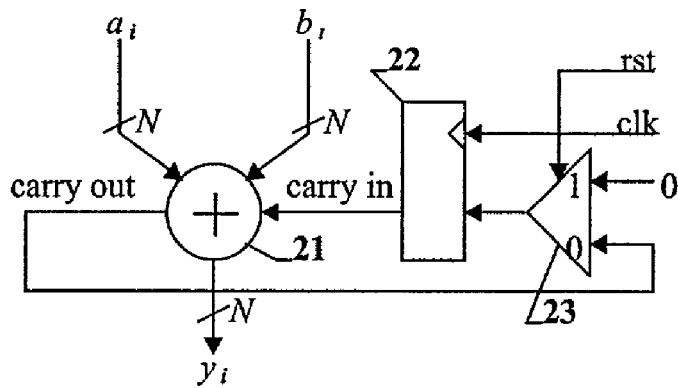
FIG. 2A shows a specific embodiment of a sequential adder in accordance with the subject invention.
Figure 2B:
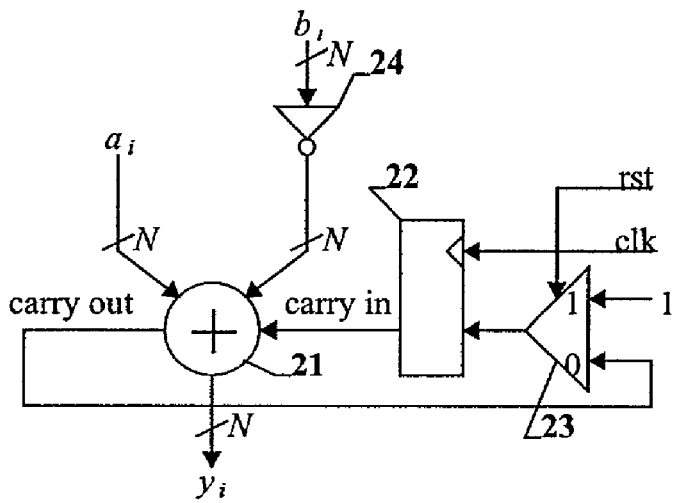
FIG. 2B shows a specific embodiment of a sequential subtractor in accordance with the subject invention.
Figure 2C:
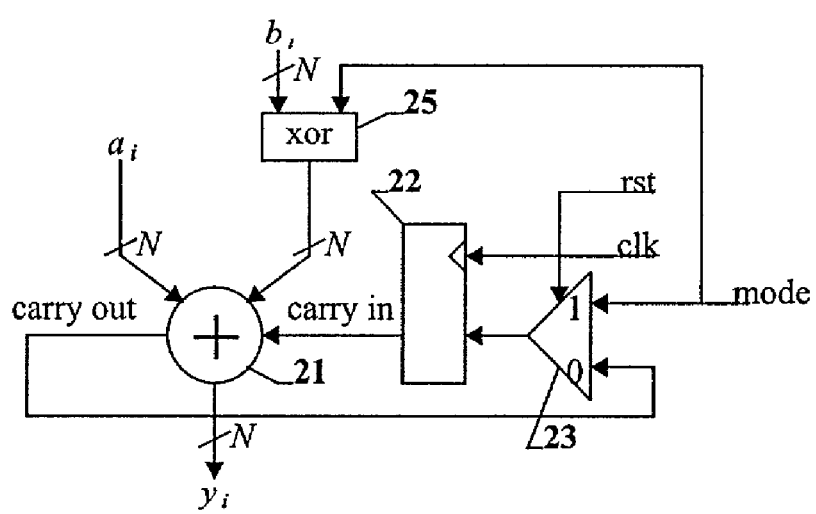
FIG. 2C shows a specific embodiment of a combined sequential adder/subtractor in accordance with the subject invention.

A block diagram of a sequential adder, sequential subtractor, and combined sequential adder and subtractor is shown in FIGS. 2A, 2B, and 2C, respectively. The sequential adder shown in FIG. 2A uses an N-bit binary adder 21 with a carry input and carry output to compute $y_i=a_i+b_i$. The carry input is supplied by a register 22 that receives its input from a multiplexer 23. To start a sequential addition operation, the rst signal is asserted for one cycle, setting the value stored in the register 22 to 0, and causing the carry in of the adder 21 to be 0. After the rst signal is negated, the sequences of operands $\{a_i|i=0, 1, 2, \ldots, k-1\}$ and $\{b_i|i=0, 1, 2, \ldots, k-1\}$ are presented to the inputs of the adder 21 at the rate of one per clock cycle to produce the sum $y_i$.

The sequential subtractor shown in FIG. 2B is used to compute the difference $y_i=a_i-b_i$. The operation of the sequential subtractor is essentially the same as the sequential adder in FIG. 2A, except the operand $b_i$ is negated by the inverters 24, and when rst is asserted, the carry-input register is set to 1.

The combined sequential adder/subtractor shown in FIG. 2C may be used to compute the sum $y_i=a_i+b_i$ or the difference $y_i=a_i-b_i$. This structure is similar to the structures presented in FIG. 2A and FIG. 2B, except the operand $b_i$ is negated using an exclusive-or operation 25 if and only if mode is asserted. Additionally, when rst is asserted, the carry input register samples mode: for an addition operation, mode will be 0, while for a subtraction operation mode will be 1.

Figure 7A:
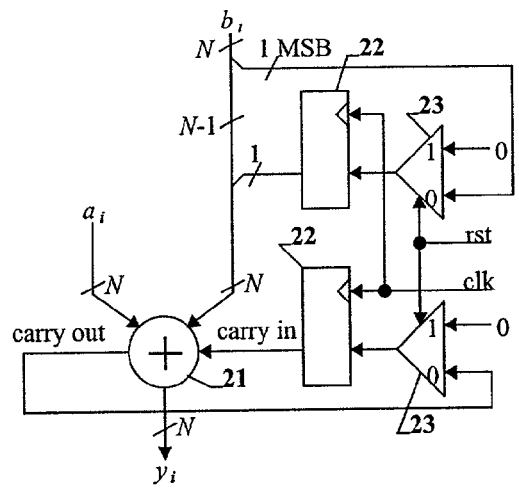
FIG. 7A shows a specific embodiment of a sequential adder with operand multiplication by two in accordance with the subject invention.
Figure 7B:
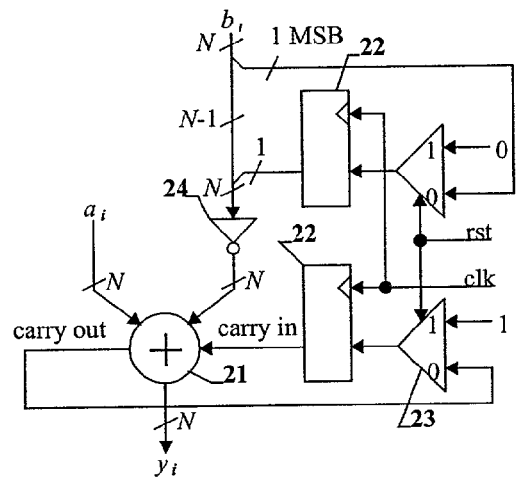
FIG. 7B shows a specific embodiment of a sequential subtractor with operand multiplication by two in accordance with the subject invention.
Figure 7C:
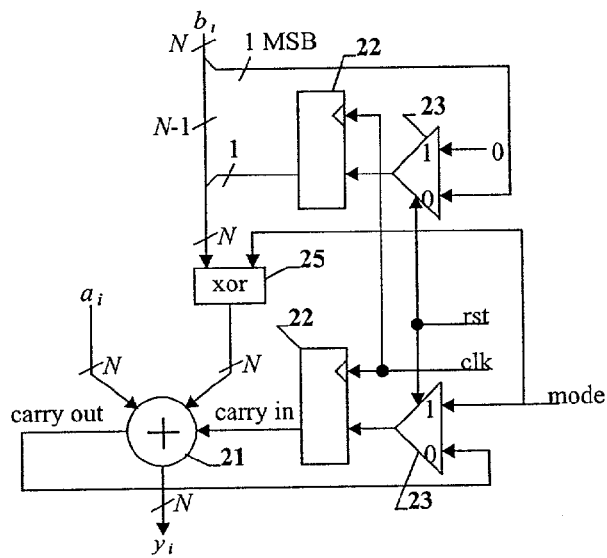
FIG. 7C shows a specific embodiment of a combined sequential adder/subtractor with operand multiplication by two in accordance with the subject invention.

A block diagram of a sequential adder with multiplication of one operand by two, a sequential subtractor with multiplication of one operand by two, and a combined sequential adder and subtractor with multiplication of one operand by two is shown in FIGS. 7A, 7B, and 7C, respectively. The sequential adder with multiplication of one operand by two shown in FIG. 7A uses an N-bit binary adder 21 with a carry input and carry output to compute $y_i=a_i+2b_i$. The operand $b_i$ is multiplied by two by shifting one bit left, saving the most significant bit (MSB) in a register 22 for the next cycle, and taking the MSB from the previous cycle, which is stored in the register 22 and making it the LSB for the current cycle. The carry input is supplied by a register 22 that receives its input from a multiplexer 23. To start a sequential addition operation, the rst signal is asserted for one cycle, setting the values stored in the carry-in register 22 and the shift register 22 to 0, and causing the carry in of the adder 21 to be 0. After the rst signal is negated, the sequences of operands $\{a_i|i=0, 1, 2, \ldots, k-1\}$ and $\{b_i|i=0, 1, 2, \ldots, k-1\}$ are presented to the inputs of the adder 21 at the rate of one per clock cycle to produce the sum $y_i$.

The sequential subtractor with multiplication of one operand by two shown in FIG. 7B is used to compute the difference $y_i=a_i-2b_i$. The operation of the sequential subtractor with multiplication of one operand by two is essentially the same as the sequential adder with multiplication of one operand by two in FIG. 7A, except the value $2b_i$ is negated by the inverters 24, and when rst is asserted, the carry-input register is set to 1.

The combined sequential adder/subtractor with multiplication of one operand by two shown in FIG. 7C may be used to compute the sum $y_i=a_i+2b_i$ or the difference $y_i=a_i-2b_i$. This structure is similar to the structures presented in FIG. 7A and FIG. 7B, except the value $2b_i$ is negated using an exclusive-or operation 25 if and only if mode is asserted. Additionally, when rst is asserted, the carry input register samples mode: for an addition operation, mode will be 0, while for a subtraction operation mode will be 1.

Implementation of sequential multiplication depends upon the use of a polynomial decomposition of the operands and sequential processing of the decomposed operands. Using the notation described above, let a and c have k digit radix b decompositions $\{a_i|i=0, 1, 2, \ldots, k-1\}$ and $\{c_i|i=0, 1, 2, \ldots, k-1\}$. Then y=ac has a 2k digit radix b decomposition $\{y_i|i=0, 1, 2, \ldots, 2k-1\}$. This can be produced by producing the sequence $\{y'_i|i=0, 1, 2, \ldots, 2k-2\}$, where $y'_i=\Sigma_{j=0}^{i}a_jc_{i-j}$, which is seen to be linear convolution, and accumulating these results by forming the sum $y=\Sigma_{i=0}^{2k-2}y'_ib^i$, wherein $\{y_i|i=0, 1, 2, \ldots, 2k-1\}$. In the preferred embodiment $b=2^N$, so the term $y'_ib^i$ can be produced by shifting the term $y'_i$ left iN bit positions.

Figure 3:
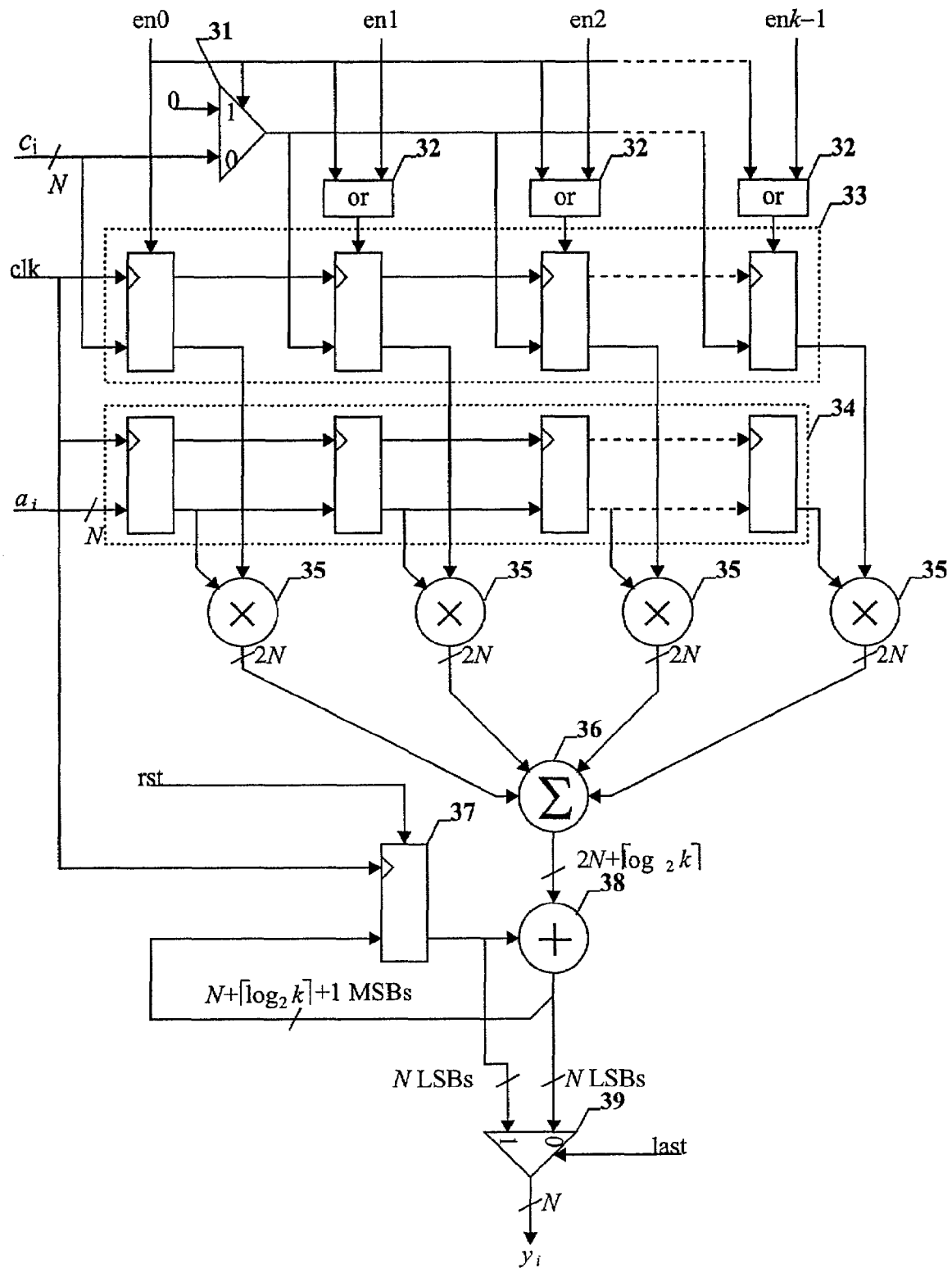
FIG. 3, shows a block diagram of a specific embodiment of a sequential multiplier in accordance with the subject invention.

A block diagram of a sequential multiplier is shown in FIG. 3. In this implementation, a register file 33 stores the operands corresponding to $b_i$, while a shift register 34 stores operands corresponding to $a_i$. The operation of the register file 33 is controlled by separate enables for each register, (en0, en1, . . . , enk-1). The en0 enable is asserted for the first data input, the en1 is asserted for the second input, and so forth. When en0 is asserted for the first input, a multiplexer 31 causes 0 to be broadcast to all of the remaining registers in the register file. The registers in the register file 33 controlled by en1, en2, . . . , enk-1, have their enables logically ORed with en0 by a plurality of OR gates 32. The $a_i$ inputs are shifted into the shift register 34 at the same time that the corresponding inputs $b_i$ are written into the register file. After the $a_i$ inputs are exhausted, zeros are shifted into the shift register 34 until the computation is completed. The products of the operands in the register file 33 and the shift register 34 are computed by a plurality of multipliers 35, and the sum of these products is computed by a multi-port adder 36. This sum of products is added to the carry from the previous sum of products by an adder 38, where the carry from the previous sum of products was stored in the previous cycle in a register 37. The carry feedback register 37 must be reset using the rst input before computation begins. For 2k-1 cycles, the output of the sequential multiplier is selected to be the output of the adder 38 by a multiplexer 39. On the last cycle of multiplication, the last signal is asserted, and the final output is selected from the carry feedback register 37 by the multiplexer 39.

In order to use the embodiment shown in FIG. 3 to directly compute a product of the two operands with decompositions $\{a_i|i=0, 1, 2, \ldots, p-1\}$ and $\{b_i|i=0, 1, 2, \ldots, p-1\}$, where p is the greatest integer such that $a_i \neq 0$ or $b_i \neq 0$, it is necessary that $k \geq p$. If p>k then the sequential multiplier shown in FIG. 3 may be profitably exploited to compute the product of the operands by applying a block multiplication algorithm using the embodiment shown in FIG. 3 as an operator in that implementation.

The sequential multiplier may be implemented using either conventional arithmetic technologies, or a more favorable implementation may be realized using RNS as suggested by the author in patent application U.S. Ser. No. 09/569,944, filed May 12, 2000, which is incorporated herein by reference.

The sequential multiplier shown in FIG. 3 multiplies two k digit radix b values to produce a 2k digit product. Use of this architecture implies that many of the products computed by the multiplication operators 35 will be multiplication by zero (producing zero). As multiplication by zero is a trivial operation compared to a general multiplication operation, it is possible to modify the architecture shown in FIG. 3 by using two sets of operators 36, 37, 38, and 39, in addition to other elements and modifications, to double the throughput of the multiplier, as for example in the embodiment illustrated in FIG. 5.

Figure 5:
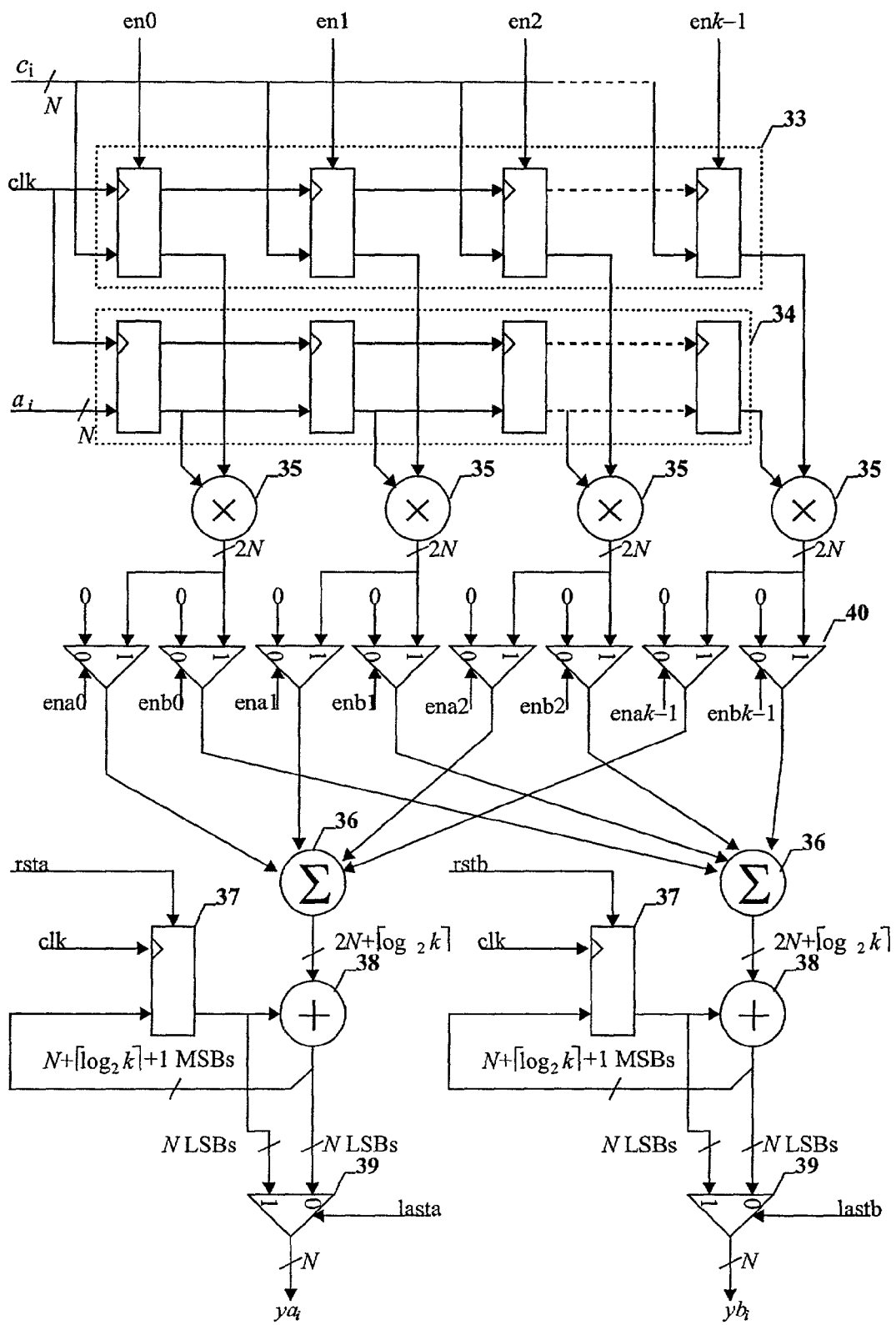
FIG. 5 shows a block diagram of a specific embodiment of a sequential multiplier in accordance with the subject invention.

The major differences between the sequential multiplier shown in FIG. 3 and the sequential multiplier shown in FIG. 5 are the following. The method for resetting the register file 33, comprising the multiplexor 31 and the OR operators 32 in FIG. 3 are not required in the sequential multiplier shown in FIG. 5. The duplicated sets of operators 36, 37, 38, and 39, are connected to the multipliers via a plurality of zero multiplexors 40. When the $a_i$ operands for a particular operation are exhausted, it is not necessary to shift zeros in to complete the operation. Instead, assertion and negation of the ena0, . . . , enak−1 and enb0, . . . , enbk−1 signals controls which multiplication operator 35 locations are providing zero, using the zero multiplexors 40, to the partial sum of products accumulators comprising operators 36, 37, 38, and 39.

Figure 6:
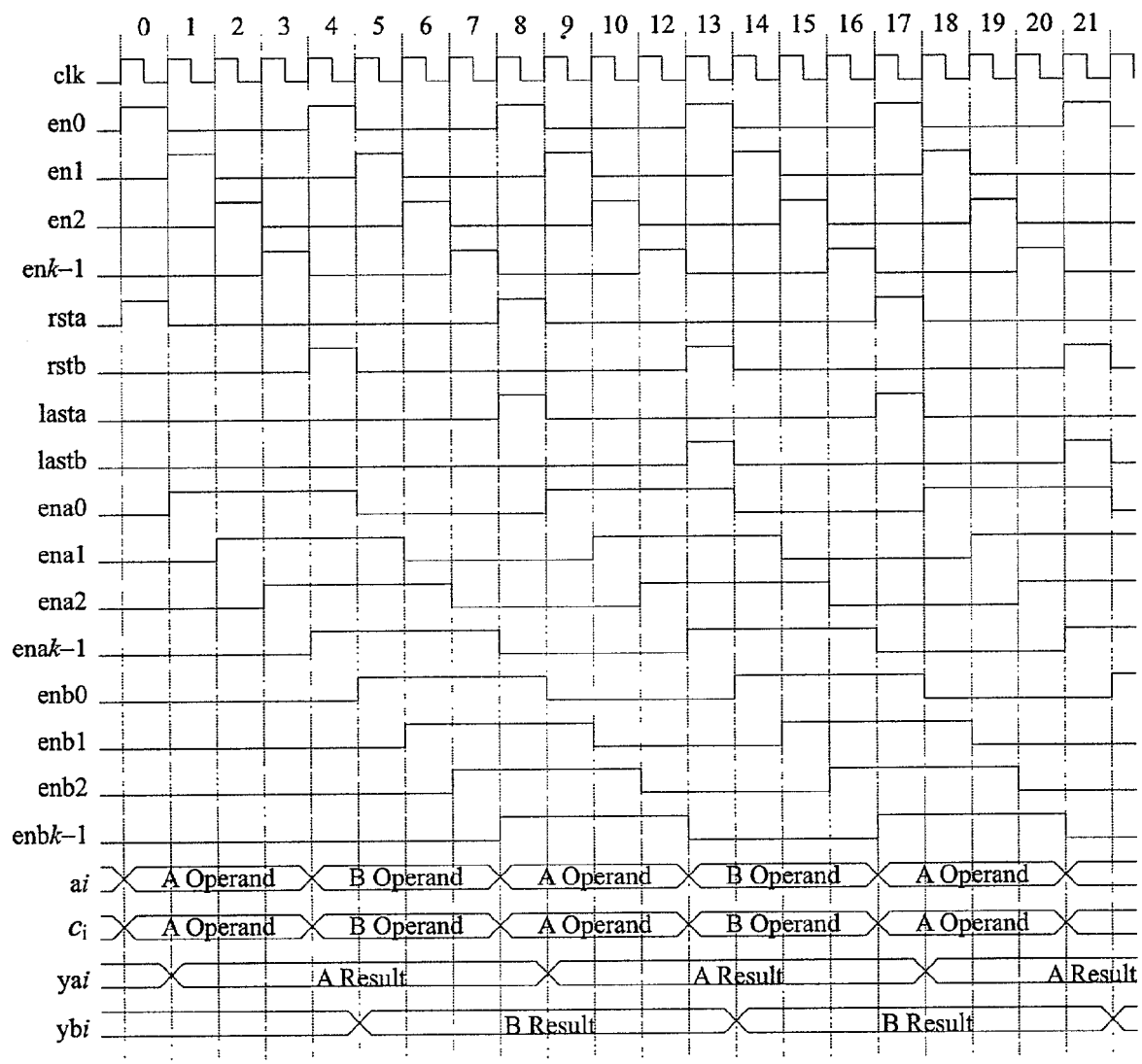
FIG. 6 shows a timing diagram illustrating the operation of a specific embodiment of a sequential multiplier in accordance with the subject invention.

The operation of the sequential multiplier shown in FIG. 5 is illustrated by example using the timing diagram shown in FIG. 6. For purposes of the example a four multiplier architecture is used, but the example is easily expanded to smaller or larger operations and architectures.

In order to use the embodiment shown in FIG. 5 to directly compute a product of the two operands with decompositions $\{a_i | i=0, 1, 2, \ldots, p-1\}$ and $\{b_i | i=0, 1, 2, \ldots, p-1\}$, where p is the greatest integer such that $a_i \neq 0$ or $b_i \neq 0$, it is necessary that $k \geq p$. If p>k then the sequential multiplier shown in FIG. 5 may be profitably exploited to compute the product of the operands by applying a block multiplication algorithm using the embodiment shown in FIG. 5 as an operator in that implementation.

Figure 10:
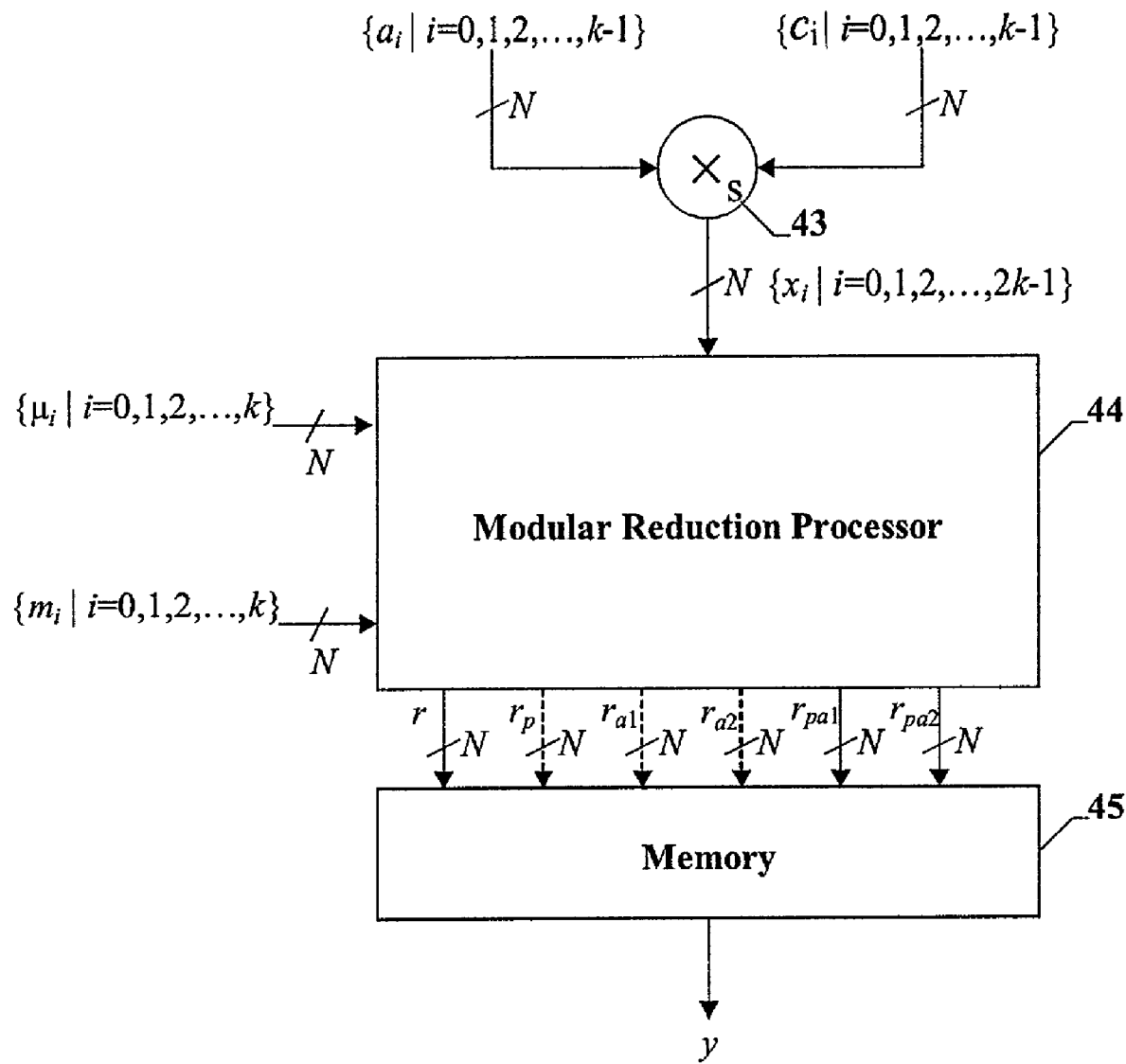
FIG. 10 shows a block diagram of a modular multiplier in accordance with the subject invention.

A block diagram of a modular multiplier is shown in FIG. 10. The modular multiplier comprises a sequential multiplier 43, that accepts two operand sequences $\{a_i | i=0, 1, 2, \ldots, k-1\}$ and $\{b_i | i=0, 1, 2, \ldots, k-1\}$, and sequentially produces the produce sequence $\{x_i | i=0, 1, 2, \ldots, 2k-1\}$. The 2k digit product produced by the sequential multiplier is input to a modular reduction processor 44, which is an embodiment of one of the implementations shown in FIGS. 1, 4, 8, and 9. The operands m and μ must also be input to the modular reduction processor. The modular reduction processor, depending upon the specific embodiment selected for implementation, will sequentially produce either three or six candidate results that are stored in a memory 45. Upon completion of the calculation the correct result is selected from the memory according to the criteria of the Barrett modular reduction algorithm.

All patents, patent applications, provisional applications, and publications referred to or cited herein are incorporated by reference in their entirety to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims.

The invention claimed is:

1. Automatic computing machinery having logic embodied thereon for performing a method of modular reduction processing of a number which is represented by a sequence of digits, comprising:
providing a modular reduction processor;
receiving a number x, wherein number x is provided in radix b form and is represented by sequence of 2k digits such that $\{x_i | i=0, 1, 2, \ldots, 2k-1\}$; and
processing x, via the modular reduction processor, wherein x is processed least significant digit first and in digits in increasing order of significance thereafter, wherein processing x comprises:
dividing x by $b^{k+1}$ to produce $q_1$;
multiplying $q_1$ by μ to produce $q_2$, wherein μ is given in radix b form and is represented by sequence of k+1 digits such that $\mu = \lfloor b^{2k}/m \rfloor$, wherein m is modulus given in radix b form and is represented by sequence of k digits such that $\{m_i | i=0, 1, 2, \ldots, 2k-1\}$ wherein $m_{k-1} \neq 0$);
dividing $q_2$ by $b^{k+1}$ to produce $q_3$;
multiplying $q_3$ by m;
reducing the product of $q_3$ multiplied by m modulo $b^{k+1}$ to produce $r_2$;
reducing x modulo $b^{k+1}$ to produce $r_1$;
subtracting $r_2$ from $r_1$ to produce r; and
determining which of the following is true:
r is non-negative and $r_{a1}$ is negative, wherein $r_{a1}$ is r−m;
r is non-negative and $r_{a1}$ is non-negative and $r_{a2}$ is negative, wherein $r_{a2}$ is r−2m;
r is non-negative and $r_{a2}$ is non-negative;
r is negative and $r_{pa1}$ is negative, wherein $r_{pa1} = r + b^{k+1} - m$;
r is negative and $r_{pa1}$ is non-negative and $r_{pa2}$ is negative, wherein $r_{pa2} = r + b^{k+1} - 2m$; and
r is negative and $r_{pa2}$ is non-negative,
wherein if r is non-negative and $r_{a1}$ is negative, x mod m=r,
wherein if r is non-negative and $r_{a1}$ is non-negative and $r_{a2}$ is negative, x mod m=r−m,
wherein if r is non-negative and $r_{a2}$ is non-negative, x mod m=r−2m,
wherein if r is negative and $r_{pa1}$ is negative, x mod m=r+$b^{k+1}$,
wherein if r is negative and $r_{pa1}$ is non-negative and $r_{pa2}$ is negative, x mod m=r+$b^{k+1}$−m, and
wherein if r is negative and $r_{pa2}$ is non-negative, x mod m=r+$b^{k+1}$−2m.

2. The automatic computing machinery according to claim 1, wherein x is received least significant digit first and in digits in increasing order of significance thereafter.

3. The automatic computing machinery according to claim 1, wherein b is a power of 2.

4. The automatic computing machinery according to claim 3, wherein dividing x by $b^{k-1}$ comprise removing the k−1 least significant digits from x.

5. The automatic computing machinery according to claim 1, wherein reducing the product of $q_3$ multiplied by m modulo $b^{k+1}$ to produce $r_2$ comprises taking the k+1 least significant digits of $q_3$m mod $b^{k+1}$.

6. The automatic computing machinery according to claim 1, wherein subtracting $r_2$ from $r_1$ to produce r comprises sequentially subtracting $r_2$ from $r_1$ to produce r.

7. The automatic computing machinery according to claim 1,
wherein the number x is received and processed sequentially, one radix b digit at a time, wherein the modular reduction processor is a sequential modular reduction processor.

8. The automatic computing machinery of claim 1, the method further comprising:
providing a shift-and-truncate down operator and a sequential multiplier, wherein:
dividing x by $b^{k+1}$ is performed via the shift-and-truncate down operator; and
multiplying $q_1$ by μ is performed via the sequential multiplier.

9. Automatic computing machinery having logic embodied thereon for performing a method of sequential multiplication for multiplying two numbers, each number having no more than kN bits, comprising:
- a. receiving a first number a, wherein a is represented by a sequence of k digits such that $\{a_i | i=0, 1, 2, \ldots, k-1\}$ and each $a_i$ is a radix b digit having N bits;
- b. receiving a second number c, wherein c is represented by a sequence of k digits such that $\{c_i | i=0, 1, 2, \ldots, k-1\}$ and each $c_i$ is a radix b digit having N bit;
- c. producing a sum $y=\Sigma_{i=0}^{2k-2} y'_i b^i$, wherein $y'_i = \Sigma_{j=0}^{i} a_j c_{i-j}$, such that $y'_i$ can be represented as a sequence of $2k-1$ digits such that $\{y'_i | i=0, 1, 2, \ldots, 2k-2\}$, wherein y is the product of a and c and can be represented by a sequence of 2k digits such that $\{y_i | i=0, 1, 2, \ldots, 2k-1\}$ and each $y_i$ is a radix b digit having N bits.

10. The automatic computing machinery according to claim 9, wherein producing the sum y comprises:
- a. inputting a least significant digit of a into a first register of a shift register;
- b. inputting a least significant digit of c into first register of a register file and setting the remaining registers of the register file to zero;
- c. multiplying a value of each register of the shift register by a value of a corresponding register of the register file and adding the products to produce a first sum;
- d. selecting the least significant N bits of the first sum as the least significant N bits of a product of a and c;
- e. selecting the most significant $N+\lfloor \log 2k \rfloor=1$ bits of the first sum and saving the most significant $N+\lfloor \log 2k \rfloor+1$ bits of the first sum in a carry register;
- f. inputting the next least significant digit of a into the first register of the shift register and shifting the shift register values;
- g. inputting the next least significant digit of c into the next register of the register file;
- h. multiplying the value of each register of the shift register by the value of a corresponding register of the register file and adding the products to produce a next first sum;
- i. adding the first sum to the value of the carry register to produce a second sum;
- j. selecting the least significant N bits of the second sum as the next least significant N bits of a product of a and c;
- k. selecting the most significant $N+\lfloor \log 2k \rfloor=1$ bits of the second sum and saving the most significant $N+\lfloor \log 2k \rfloor+1$ bits of the second sum in the carry register;
- l. inputting the next least significant digit of a into the first register of the shift register and shifting the shift register values;
- m. inputting the next least significant digit of c into the next register of the register file;
- n. multiplying the value of each register of the shift register by the value of the corresponding register of the register file and adding the products to produce a next first sum;
- o. adding the next first sum to the value of the carry register to produce a next second sum;
- p. selecting the least significant N bits of the next second sum as the next least significant N bits of the product of a and c;
- q. selecting the most significant $N+\lfloor \log 2k \rfloor+1$ bits of the next second sum and saving the most significant $N+\lfloor \log 2k \rfloor+1$ bits of the next second sum in the carry register;
- r. repeating steps j through o k−3 times;
- s. inputting a zero into the first register of the shift register and shifting the shift register values;
- t. multiplying the value of each register of the shift register by the value of the corresponding register file and adding the products to produce a next first sum;
- u. adding the next first sum to the value of the carry register to produce a next second sum;
- v. selecting the least significant N bits of the next second sum as the next least significant N bits of the product of a and c;
- w. selecting the most significant $N+\lfloor \log 2k \rfloor+1$ bits of the next second sum in the carry register;
- x. repeating steps s through w k−1 times; and
- y. selecting the value in the carry register as the most significant N bits of the product of a and c.

11. Automatic computing machinery having logic embodied thereon for performing a method of modular reduction processing of a product of two numbers, comprising:
- receiving a first number a, wherein a is provided in radix b form and is represented by a sequence of k digits such that $\{a_i | i=0, 1, 2, \ldots, k-1\}$;
- receiving a second number c, wherein c is provided in radix b form and is represented by a sequence of k digits such that $\{c_i | i=0, 1, 2, \ldots, k-1\}$;
- multiplying the first number and the second number to produce a product which is represented by a sequence of 2k digits;
- inputting the product into a modular reduction processor, wherein the modular reduction processor outputs one or more of the following:
- $r$, $r-m$, $r-2m$, $r+b^{k+1}$, $r+b^{k+1}-m$, and $r+b^{k+1}-2m$, wherein $r=x \mod b^{k+1} - m[[\mu(x/b^{k-1})]/b^{k+1}] \mod b^{k+1}$, into a means for determining which of the following is true:
- r is non-negative and $r_{a1}$ is negative, wherein $r_{a1}$ is r−m;
- r is non-negative and $r_{a1}$ is non-negative and $r_{a2}$ is negative, wherein $r_{a2}$ is r−2m;
- r is non-negative and $r_{a2}$ is non-negative;
- r is negative and $r_{pa1}$ is negative, wherein $r_{pa1}=r+b^{k+1}-m$;
- r is negative and $r_{pa1}$ is non-negative and $r_{pa2}$ is negative, wherein $r_{pa2}=r+b^{k+1}-2m$; and
- r is negative and $r_{pa2}$ is non-negative,
- wherein if r is non-negative and $r_{a1}$ is negative, x mod m=r,
- wherein if r is non-negative and $r_{a1}$ is non-negative and $r_{a2}$ is negative, x mod m=r−m,
- wherein if r is non-negative and $r_{a2}$ is non-negative, x mod m=r−2m,
- wherein if r is negative and $r_{pa1}$ is negative, x mod m=r+$b^{k+1}$,
- wherein if r is negative and $r_{pa1}$ is non-negative and $r_{pa2}$ is negative, x mod m=r+$b^{k+1}$−m, and
- wherein if r is negative and $r_{pa2}$ is non-negative, x mod m=r+$b^{k+1}$−2m.

12. An apparatus for modular reduction processing of a number which is represented by a sequence of digits, comprising:
- a means for receiving a number x, wherein number x is provided in radix b form and is represented by sequence of 2k digits such that $\{x_i | =0, 1, 2, \ldots, 2k-1\}$;
- a means for processing x, wherein x is processed least significant digit first and in digits in increasing order of significance thereafter, wherein the means for processing x comprises:
- a means for dividing x by $b^{k-1}$ produce $q_i$;
- a means for multiplying $q_1$, by $\mu$ to produce $q_2$, wherein $\mu$ is given in radix b form and is represented by sequence of k+1 digits such that $\mu=\lfloor b^{2k/m} \rfloor$, wherein m is modulus given in radix b form and is represented by sequence of k digits such that $\{m_1 | =0, 1, 2, \ldots, 2k-1\}$ wherein $m_{k-1} \neq 0$);

a means for dividing $q_2$ by $b^{k+1}$ to produce $q_3$;
a means for multiplying $q_3$ by m;
a means for reducing the product of $q_3$ multiplied by m modulo $b^{k+1}$ to produce $r_2$;
a means for reducing x modulo $b^{k+1}$ to produce $r_1$;
a means for subtracting $r_2$ from $r_1$ to produce r; and
a means for determining which of the following is true:
r is non-negative and $r_{a1}$ is negative, wherein $r_{a1}$ is r−m;
r is non-negative and $r_{a1}$ is non-negative and $r_{a2}$ is negative, wherein $r_{a2}$ is r−2m;
r is non-negative and $r_{a2}$ is non-negative;
r is negative and $r_{pa1}$ is negative, wherein $r_{pa1}$=r+$b^{k+1}$−m; and
r is negative and $r_{pa1}$ is non-negative and $r_{pa2}$ is negative, wherein $r_{pa2}$=y+$b^{k+}$−2m; and
r is negative and $r_{pa2}$ is non-negative,
wherein if r is non-negative and $r_{a1}$ is negative, x mod m=r,
wherein if r is non-negative and $r_{a1}$ is non-negative and $r_{a2}$ is negative, x mod m=r−m,
wherein if r is non-negative and $r_{a2}$ non-negative, x mod m=r−2m,
wherein if r is negative and $r_{pa1}$ is negative, x mod m=r+$b^{k+1}$,
wherein if r is negative and $r_{pa1}$ is non-negative and $r_{pa2}$ is negative, x mod m=r+$b^{k-1}$−m, and
wherein if r is negative and $r_{pa1}$ is non-negative, x mod m=r+$b^{k+1}$−2m.

13. The apparatus according to claim 12, wherein x is received least significant digit first and in digits in increasing order of significance thereafter.

14. The apparatus according to claim 12, wherein b is a power of 2.

15. The apparatus according to claim 14, wherein a means for dividing x by $b^{k-1}$ comprises removing the k−1 least significant digits from x.

16. The apparatus according to claim 12, wherein a means for reducing the product of $q_3$ multiplied by m modulo $b^{k+1}$ to produce $r_2$ comprises a means for taking the k+1 least significant digits of $q_3$m mod $b^{k+1}$.

17. The apparatus according to claim 12, wherein a means for subtracting $r_2$ from $r_1$ to produce r comprises sequentially subtracting $r_2$ from $r_1$ to produce r.

18. An apparatus for sequential multiplication for multiplying two numbers, each number having no more than kN bits, comprising:
  a. a means for receiving a first number a, wherein a is represented by a sequence of k digits such that $\{a_i|i=0, 1, 2, \ldots, k-1\}$ and each $a_i$ is a radix b digit having N bits;
  b. a means for receiving a second number c, wherein c is represented by a sequence of k digits such that $\{c_i|i=0, 1, 2, \ldots, k-1\}$ and each $c_i$ is a radix b digit having N bit;
  c. a means for producing a sum $y=\Sigma_{i=0}^{2k-2}$ wherein $y_i'=\Sigma_{j=0}^{i}a_jc_{i-j}$, such that $y_i'$ can be represented as a sequence of 2k−1 digits such that $\{y_i'|i=0, 1, 2, \ldots, 2k-2\}$, wherein y is the product of a and c and can be represented by a sequence of 2k digits such that $\{y_i|i=0, 1, 2, \ldots, 2k-1\}$ and each $y_i$ is a radix b digit having N bits.

19. The apparatus according to claim 12, wherein the number x is received and processed sequentially, one radix b digit at a time.

20. The apparatus according to claim 12, wherein:
the means for processing x comprises a modular reduction processor;
the means for dividing x by $b^{k+1}$ comprises a shift-and-truncate down operator; and
the means for multiplying $q_i$ by μ comprises a sequential multiplier.

21. An apparatus for modular reduction processing of a product of two numbers, comprising:
a means for receiving a first number a, wherein a is provided in radix b form and is represented by a sequence of k digits such that $\{a_i|i=0, 1, 2, \ldots, k-1\}$;
a means for receiving a second number c, wherein c is provided in radix b form and is represented by a sequence of k digits such that $\{c_i|i=0, 1, 2, \ldots, k-1\}$;
a means for multiplying the first number and the second number to produce a product which is represented by a sequence of 2k digits;
a means for inputting the product into a modular reduction processor, wherein the modular reduction processor outputs one or more of the following:
r, r−m, r−2m, r+$b^{k+1}$, r+$b^{k+1}$−m, and r+$b^{k+1}$−2m, wherein r=x mod $b^{k+}$−m[[μ(x/$b^{k-1}$)]/$b^{k+1}$]mod $b^{k+1}$, into a means for determining which of the following is true:
r is non-negative and $r_{a1}$ is negative, wherein $r_{a1}$ is r−m;
r is non-negative and $r_{a1}$ is non-negative and $r_{a2}$ is negative, wherein $r_{a2}$ is r−2m;
r is non-negative and $r_{a2}$ is non-negative;
r is negative and $r_{pa1}$ is negative, wherein $r_{pa1}$=r+$b^{k+1}$−m;
r is negative and $r_{pa1}$ is non-negative and $r_{pa2}$ is negative, wherein $r_{pa2}$=r+$b^{k+1}$−2m; and
r is negative and $r_{pa2}$ is non-negative,
wherein if r is non-negative and $r_{a1}$, is negative, x mod m=r,
wherein if r is non-negative and $r_{a1}$ is non-negative and $r_{a2}$ is negative, x mod m=r−m,
wherein if r is non-negative and $r_{a2}$ is non-negative, x mod m=r−2m,
wherein if r is negative and $r_{pa1}$ is negative, x mod m=r+$b^{k+1}$,
wherein if r is negative and $r_{pa1}$ is non-negative and $r_{pa2}$ is negative, x mod m=r+$b^{k+1}$−m, and
wherein if r is negative and $r_{pa2}$ is non-negative, x mod m=r+bhu k+1−2m.

* * * * *

UNITED STATES PATENT AND TRADEMARK OFFICE
CERTIFICATE OF CORRECTION

PATENT NO. : 7,607,165 B2
APPLICATION NO. : 10/096038
DATED : October 20, 2009
INVENTOR(S) : Jonathon D. Mellott and Patrick Dennis Rugg It is certified that error appears in the above-identified patent and that said Letters Patent is hereby corrected as shown below:

Column 5,
Line 1: "and the w sequential" should read -- and the sequential --

Column 6,

Line 10: " $y'_i = \sum_{j=0}{}^{i} a_j c_{i-j}$ " should read -- $y'_i = \sum_{j=0}^{i} a_j c_{i-j}$ --

Line 12: " $y = \sum_{i=0}{}^{2k-2} y'_i b^i$ " should read -- $y = \sum_{i=0}^{2k-2} y'_i b^i$ --

Column 9,

Line 11: " $y = \sum_{i=0}{}^{2k-2} y'_i b^i$ wherein $y'_i = \sum_{j=0}{}^{i} a_j c_{i-j}$ " should read -- $y = \sum_{i=0}^{2k-2} y'_i b^i$ wherein $y'_i = \sum_{j=0}^{i} a_j c_{i-j}$ --

Column 10,
Line 66: "$m_1$ | =0, 1, 2" should read -- $m_i$ | i=0, 1, 2 --

Column 11,
Line 26: "$r_{pa1}$" should read -- $r_{pa2}$ --

Line 52-53: " $y = \sum_{i=0}{}^{2k-2}$ , wherein $y'_i = \sum_{j=0}{}^{i} a_j c_{i-j}$ " should read -- $y = \sum_{i=0}^{2k-2} y'_i b^i$ , wherein $y'_i = \sum_{j=0}^{i} a_j c_{i-j}$ --

CERTIFICATE OF CORRECTION (continued)
U.S. Pat. No. 7,607,165 B2

Column 12,
Line 1: "$\{y_i' \mid i=0,1,2,\ldots,2k-2\}$" should read -- $\{y'_i \mid i=0,1,2,\ldots,2k-2\}$ --

Line 31: "$r = x \bmod b^{k+}\text{-}m[[\mu(x/b^{k-1})]/b^{k+1}]$" should read -- $r = x \bmod b^{k+1}\text{-}m[[\mu(x/b^{k-1})]/b^{k+1}]$ --

Line 41: "wherein if $r$ is non-negative and $r_{a1}$, is" should read -- wherein if $r$ is non-negative and $r_{a1}$ is --

Line 51: "m=r+bhu k+1-2m" should read -- $m=r+b^{k+1}\text{-}2m$ --

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,607,165 B2  Page 1 of 1
APPLICATION NO. : 10/096038
DATED : October 20, 2009
INVENTOR(S) : Mellott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Twelfth Day of October, 2010

David J. Kappos
*Director of the United States Patent and Trademark Office*